(12) United States Patent
Wu et al.

(10) Patent No.: US 11,880,068 B2
(45) Date of Patent: Jan. 23, 2024

(54) SPACE OPTICAL COUPLING APPARATUS (71) Applicant: HUAWEI TECHNOLOGIES CO., LTD., Shenzhen (CN)

(72) Inventors: Yuping Wu, Shenzhen (CN); Chunhui Zhang, Wuhan (CN); Changzheng Su, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 59 days.

(21) Appl. No.: 17/527,757

(22) Filed: Nov. 16, 2021

(65) Prior Publication Data
US 2022/0075119 A1   Mar. 10, 2022

Related U.S. Application Data (63) Continuation of application No. PCT/CN2020/074226, filed on Feb. 3, 2020.

(30) Foreign Application Priority Data

May 24, 2019  (CN) .......................... 201910440925.0

(51) Int. Cl.
*H04B 10/60* (2013.01)
*G02B 6/26* (2006.01)
(Continued)

(52) U.S. Cl.
CPC .............. *G02B 6/26* (2013.01); *H04B 10/61* (2013.01); *H04B 10/801* (2013.01); *H04J 14/02* (2013.01);
(Continued)

(58) Field of Classification Search
CPC .......... G02B 6/26; G02B 6/262; H04B 10/61; H04B 10/801; H04B 10/1121;
(Continued)

(56) References Cited

U.S. PATENT DOCUMENTS 6,493,490 B1 * 12/2002 Steiger ................. H04B 10/112
356/400
7,382,465 B1 * 6/2008 Pepper ................... G01H 9/004
356/485
(Continued)

FOREIGN PATENT DOCUMENTS

CN    1318764 A    10/2001
CN    101159365 A    4/2008
(Continued)

OTHER PUBLICATIONS

Geng et al, CN105977780A, Sep. 2016, ESPACENET, All Document. (Year: 2016).*
(Continued)

*Primary Examiner* — Dibson J Sanchez
(74) *Attorney, Agent, or Firm* — Rimon PC (57) ABSTRACT

A space optical coupling apparatus, including M first couplers, a phase adjustment apparatus, N beam splitters, M second couplers, a coupling apparatus, and a controller. The first coupler receives a beam, and couples the beam to the phase adjustment apparatus. The phase adjustment apparatus includes M phase adjusters, N beam splitters, and N detectors. Each beam splitter is configured to split a received beam into two beams, one sent to a corresponding detector and the other sent to a corresponding phase adjuster. The second coupler receives output light from the coupling apparatus, and transmits the output light into the space. The coupling apparatus is configured to couple a beam onto a single-mode fiber. The controller is configured to control, based on the beam intensity detected by the detector and the beam intensity on the single-mode fiber, the M phase adjusters to adjust the phases of the received beams.

11 Claims, 6 Drawing Sheets

(51) Int. Cl.
*H04B 10/61* (2013.01)
*H04B 10/80* (2013.01)
*H04J 14/02* (2006.01)
*H04B 10/11* (2013.01)
*H04B 10/67* (2013.01)
*H04B 10/112* (2013.01)

(52) U.S. Cl.
CPC .......... *H04B 10/11* (2013.01); *H04B 10/1121* (2013.01); *H04B 10/60* (2013.01); *H04B 10/615* (2013.01); *H04B 10/67* (2013.01)

(58) Field of Classification Search
CPC .... H04B 10/118; H04B 10/803; H04B 10/60; H04B 10/11; H04B 10/615; H04B 10/67; H04J 14/02
USPC .................. 398/118–131, 202–214
See application file for complete search history.

(56) References Cited

U.S. PATENT DOCUMENTS

| | | | | | |
|---|---|---|---|---|---|
| 8,041,161 | B1* | 10/2011 | Lane | ...................... | G02B 6/262 385/39 |
| 8,160,452 | B1* | 4/2012 | Tidwell | ................ | H04B 10/118 398/139 |
| 8,229,304 | B1* | 7/2012 | Pepper | .................... | H04B 10/61 398/209 |
| 8,995,841 | B1* | 3/2015 | Chalfant, III | ...... | H04B 10/1125 398/131 |
| 10,411,797 | B1* | 9/2019 | Mitchell | .............. | G02B 6/4249 |
| 10,419,113 | B2* | 9/2019 | Dawson | .................. | H04J 14/08 |
| 10,598,785 | B2* | 3/2020 | Khial | ....... | G01S 17/42 |
| 2004/0052465 | A1* | 3/2004 | Verbana | ............... | G02B 6/4249 385/88 |
| 2012/0177384 | A1 | 7/2012 | Ryf | | |
| 2014/0153922 | A1* | 6/2014 | Ryf | ........................ | H04B 10/50 398/44 |
| 2014/0321863 | A1* | 10/2014 | Diab | .................... | H04B 10/272 398/189 |
| 2015/0098697 | A1* | 4/2015 | Marom | ................ | G02B 6/2848 398/44 |
| 2016/0033766 | A1* | 2/2016 | Hajimiri | ............... | G02B 5/1842 348/322 |
| 2017/0299900 | A1* | 10/2017 | Montoya | ................ | G02F 1/0121 |
| 2017/0324162 | A1* | 11/2017 | Khachaturian | .... | H01Q 21/0087 |
| 2017/0357142 | A1* | 12/2017 | Spector | .................. | G02B 27/30 |
| 2018/0026721 | A1 | 1/2018 | Bock et al. | | |
| 2018/0348592 | A1* | 12/2018 | Hosseini | ............ | G02B 27/0087 |
| 2020/0326479 | A1* | 10/2020 | Chanclou | ............. | G02B 6/2808 |
| 2020/0366371 | A1* | 11/2020 | Tempone | ................ | H04B 10/1123 |
| 2020/0403697 | A1* | 12/2020 | Perlot | .................. | G02B 6/4246 |

FOREIGN PATENT DOCUMENTS

| | | |
|---|---|---|
| CN | 101873169 A | 10/2010 |
| CN | 104037606 A | 9/2014 |
| CN | 105406334 A | 3/2016 |
| CN | 105977780 A | 9/2016 |
| CN | 106443890 A | 2/2017 |
| CN | 108667516 A | 10/2018 |
| WO | 2018017663 A1 | 1/2018 |
| WO | 2018123921 A1 | 7/2018 |

OTHER PUBLICATIONS

Geng et al, CN104037606A, Sep. 2014, ESPACENET, All Document. (Year: 2014).*

* cited by examiner

SPACE OPTICAL COUPLING APPARATUS

CROSS-REFERENCE TO RELATED APPLICATIONS

This application is a continuation of International Application No. PCT/CN2020/074226, filed on Feb. 3, 2020, which claims priority to Chinese Patent Application No. 201910440925.0, filed on May 24, 2019. The disclosures of the aforementioned applications are hereby incorporated by reference in their entireties.

TECHNICAL FIELD

This application relates to the field of space optical communications technologies, and in particular, to a space optical coupling apparatus.

BACKGROUND

Space optical communication will become an important component in future communications systems, and is already an effective supplement to current communications systems. An important development direction of space optical communication technology is coherent space optical communication technique.

In a coherent space optical communications system, coupling of light from space to a single-mode fiber faces many difficulties. For example, first, after a beam passes through the atmosphere, the beam may exhibit effects such as a laser intensity fluctuation, a phase fluctuation, an angle of arrival fluctuation, and beam wander, which cause a focused spot to shake on the end face of the optical fiber. In addition, a spot mode and a propagation mode of the optical fiber have low consistency. Second, an environmental change, a warm-up drift, and the like cause relative movement between the optical fiber and an incident beam, resulting muttering of the focused spot after the beam is focused on the end face of the optical fiber. In addition, the movement of an acquisition, tracking, pointing (ATP) system that is used to implement the positioning of the optical fiber may also cause relative movement of the incident beam and the optical fiber. In conclusion, the atmosphere, the environment, and the movement of the ATP system will cause beam wander, an angle of arrival fluctuation, a laser intensity fluctuation, a phase fluctuation, beam expansion, and the like, which inevitably affect optical fiber coupling.

Figure 1:
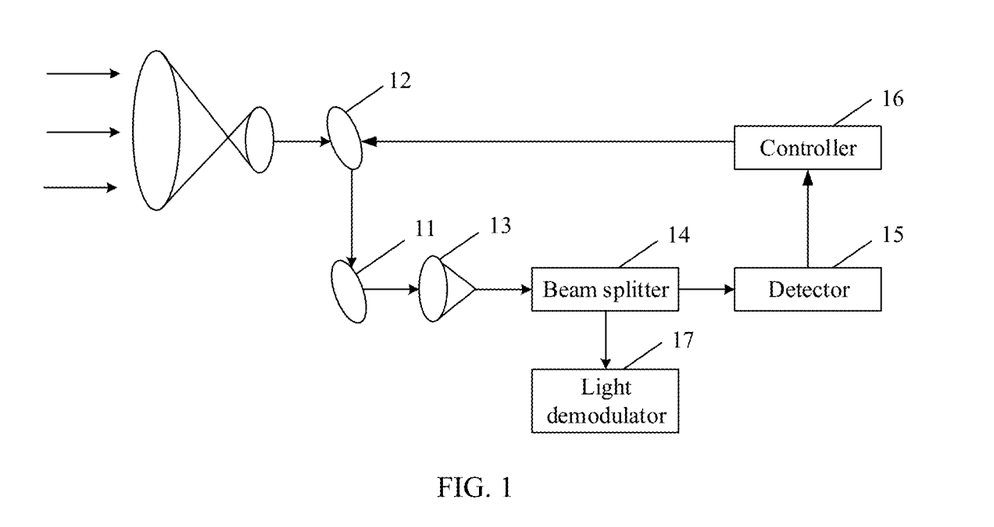
FIG. 1 is a schematic diagram of a space optical coupling apparatus according to the prior art.

To avoid or reduce the adverse impacts described above, the prior art provides a space optical coupling apparatus that uses an optical fiber nutation tracking technology. The apparatus is also referred to as an optical receiving apparatus. FIG. 1 is a schematic diagram of a space optical coupling apparatus provided in the prior art. As shown in FIG. 1, the optical receiving apparatus includes two fast steering mirrors (which are respectively a fast-steering mirror 11 and a fast steering mirror 12), a coupler 13, a beam splitter 14, a detector 15, a controller 16, and an optical demodulator 17. The fast-steering mirror 11 modulates a received beam, so that after the beam passes through the coupler 13, a spot slightly moves circularly on an end surface of an optical fiber. The beam splitter 14 splits and sends a beam of light to the detector 15, so that the detector 15 performs light detection. The controller 16 calculates, based on a case in which an optical signal detected by the detector 15 changes with time, a deviation between a center of a current spot circular motion and a fiber core, and then controls the fast steering mirror 12 to adjust the center of the circular motion and the fiber core so they overlap with each other. Another beam of light obtained through splitting by the beam splitter 14 is sent to the optical demodulator 17. Although such apparatus can counteract the impact of beam wander and angle of arrival fluctuation on optical fiber coupling, the impact of a laser intensity fluctuation, a phase fluctuation, beam expansion, and the like on optical fiber coupling cannot be counteracted.

SUMMARY

This application provides a space optical coupling apparatus, so as to counter-balance or cancel impact from beam wander, an angle of arrival fluctuation, a laser intensity fluctuation, a phase fluctuation, beam expansion, and the like on optical fiber coupling.

According to a first aspect, this application provides a space optical coupling apparatus, including: M first couplers, a phase adjustment apparatus, M second couplers, a coupling apparatus, and a controller, where the M first couplers are in a one-to-one correspondence with the M second couplers, and M is a positive integer greater than 1; the first coupler is configured to receive a beam and couple the beam to the phase adjustment apparatus; the phase adjustment apparatus includes M input ports, M phase adjusters, M output ports, N beam splitters, and N detectors, where $1 \leq N \leq M$, and N is an integer; and the M input ports are connected in a one-to-one correspondence with the M phase adjusters, and the M phase adjusters are connected in a one-to-one correspondence with the M output ports; the phase adjustment apparatus receives M beams respectively from the M first couplers by using the M input ports; each beam splitter of the N beam splitters is located between an input port and a phase adjuster corresponding to the input port, and is configured to split a received beam into two beams, one beam is sent to a corresponding detector, and the other beam is sent to a corresponding phase adjuster; the N beam splitters are respectively in a one-to-one correspondence with N input ports of the M input ports; the M second couplers are configured to: receive output light respectively from the M output ports, and couple the output light to the coupling apparatus; the coupling apparatus is configured to couple the received beam to a single-mode fiber; and the controller is configured to obtain a beam intensity detected by each detector and a beam intensity on the single-mode fiber, and control, based on the beam intensity detected by each detector and the beam intensity on the single-mode fiber, the M phase adjusters to respectively adjust phases of received beams.

The controller is configured to control, based on the beam intensity detected by each detector and the beam intensity on the single-mode fiber, the M phase adjusters to respectively adjust phases of light on corresponding optical fibers or waveguides. Therefore, a phase relationship of beams emitted from the M output ports is made similar to a phase relationship of Gaussian beams. Wavefront phase compensation and light collection efficiency are improved. Further, impacts by a laser intensity fluctuation, a phase fluctuation, beam expansion, and the like on optical fiber coupling can be counteracted. Further, when an array of first couplers is a lens array, the coupling efficiency from space to the single-mode fiber can be significantly improved due to the relatively uniform phase of an optical signal irradiated onto a single lens.

Optionally, the controller is configured to: reconstruct, based on the beam intensity detected by each detector and the beam intensity on the single-mode fiber, wavefront information of the beam received by the space optical coupling apparatus, and control, based on the wavefront information, the M phase adjusters to respectively adjust the phases of the received beams.

Optionally, each input port in the phase adjustment apparatus is connected to a corresponding phase adjuster, and each phase adjuster is connected to a corresponding output port via an optical fiber or a waveguide.

Optionally, the apparatus further includes M first drive apparatuses, and the M first drive apparatuses are in a one-to-one correspondence with the M input ports; and each first drive apparatus is configured to adjust a position of a corresponding input port, so that the center of the spot of a received beam is aligned with a center position on a corresponding optical fiber or waveguide, thereby improving optical coupling efficiency of the space optical coupling apparatus.

Optionally, the controller is configured to control the M phase adjusters to adjust the phases of the received beams based on the beam intensity detected by each detector, the beam intensity on the single-mode fiber, and a displacement amount of each input port.

Optionally, the controller is configured to: reconstruct, based on the beam intensity detected by each detector, the beam intensity on the single-mode fiber, and the displacement amount of each input port, the wavefront information of the beam received by the space optical coupling apparatus, and control, based on the wavefront information, the M phase adjusters to respectively adjust the phases of the received beams. That is, the controller may calculate wavefront information of an incident beam by using a displacement amount of an input port. In this case, the information may be used to adjust a phase adjuster on the optical fiber/the waveguide based on a feedback signal, so as to implement more accurate and faster adjustment of relative phases of signals in different optical fibers/waveguides.

Optionally, the controller is further configured to adjust the coupling apparatus, so that the spot of an output beam of the coupling apparatus is located at a center position of an end face of the single-mode fiber. The coupling efficiency of the single-mode fiber can be further improved.

Optionally, a coupler arrangement manner in an array of first couplers is a hexagonal dense arrangement manner. This arrangement manner can maximize space coverage of the coupler.

Optionally, the M second couplers are located in one plane, and the space optical coupling apparatus further includes a second drive apparatus connected to the coupling apparatus; and the second drive apparatus is configured to drive the coupling apparatus to move in a plane parallel to the plane in which the M second couplers are located. In this way, the coupler can track the spot center position of a beam in real time, thereby improving coupling efficiency of the single-mode fiber.

Optionally, the space optical coupling apparatus further includes an optical signal processing unit whose two ends are respectively connected to the single-mode fiber and the controller; and the optical signal processing unit is configured to process a beam in the single-mode fiber, obtain the beam intensity in the single-mode fiber, and send the beam intensity in the single-mode fiber to the controller. The optical signal processing unit may be an optical amplifier or a coherent detector.

Optionally, some or all devices included in the foregoing space optical coupling apparatus may be integrated. For example, the M first couplers, the optical fiber or the waveguide, the N beam splitters, the phase adjustment apparatus, the M second couplers, and the coupling apparatus may be integrated into one module. Alternatively, the M first couplers, the optical fiber or the waveguide, the N beam splitters, the phase adjustment apparatus, the M second couplers, the coupling apparatus, and the controller may be integrated into one module. Based on this, on one hand, coupling efficiency of the space optical coupling apparatus can be improved, so that the space optical coupling apparatus can adapt to turbulence caused by different intensities, and the stability of the space optical coupling apparatus in resisting earthquakes and high and low temperatures can be improved. On the other hand, the space optical coupling apparatus has a small size factor, low power consumption, and an easy integration effect. Finally, because devices in the space optical coupling apparatus can implement module integration, a feedback loop of the apparatus can be reduced, and a feedback speed of the space optical coupling apparatus can be improved.

In some embodiments of this application, a space optical coupling apparatus is provided. The controller is configured to control, based on the beam intensity detected by each detector and the beam intensity on the single-mode fiber, the M phase adjusters to respectively adjust phases of light on corresponding optical fibers or waveguides. Therefore, a phase relationship of beams emitted from the M output ports is made similar to a phase relationship of Gaussian beams. Wavefront phase compensation and light collection efficiency are improved. Further, impacts from laser intensity fluctuation, phase fluctuation, beam expansion, and the like on the optical fiber coupling can be cancelled or reduced. Further, when the first coupler is a lens, the coupling efficiency from space to the single-mode fiber can be significantly improved due to a relatively uniform phase of an optical signal irradiated to a single lens. In addition, when the space optical coupling apparatus includes the second drive apparatus connected to the coupling apparatus, the second drive apparatus is configured to drive the coupling apparatus to move in a plane parallel to the plane in which the second couplers are located. In this way, the coupler can track a spot center position of a beam in real time, thereby improving coupling efficiency of the single-mode fiber. In addition, devices in the space optical coupling apparatus can be modularly integrated, so that the performance and stability of the space optical coupling apparatus can be improved, and a small size, low power consumption, and an easy integration effect of the space optical coupling apparatus can be implemented.

DESCRIPTION OF EMBODIMENTS

Figure 2:
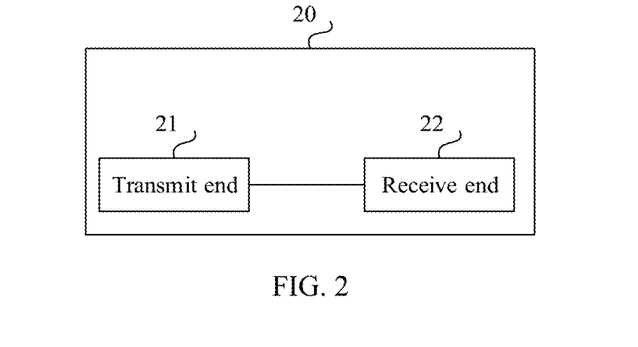
FIG. 2 is a schematic diagram of a space optical communications system according to this application.

Before a space optical coupling apparatus is described, the following first describes a space optical communications system, where the system includes a transmit end and a receive end, and the space optical coupling apparatus may be a part or all of the receive end. Specifically, FIG. 2 is a schematic diagram of a space optical communications system 20 according to this application. The space optical communications system 20 includes a transmit end 21 and a receive end 22. A working principle of the space optical communications system is as follows: The transmit end 21 modulates a light beam, loads a signal onto the light beam, and then transmits the light bean using an optical transmitting apparatus. The receive end receives a beam sent by the transmit end, couples the beam to a single-mode fiber, and demodulates the signal from the beam to implement space optical communications.

As described in the background, coupling of a light beam received from space onto a single-mode fiber faces many difficult challenges, even though the apparatus shown in FIG. 1 can counteract different impacts from beam wander and an angle of arrival fluctuation on optical fiber coupling, the impact of a laser intensity fluctuation, a phase fluctuation, beam expansion, and the like on optical fiber coupling however cannot be cancelled. Therefore, to solve this technical problem, this application provides an improved space optical coupling apparatus.

Figure 3:
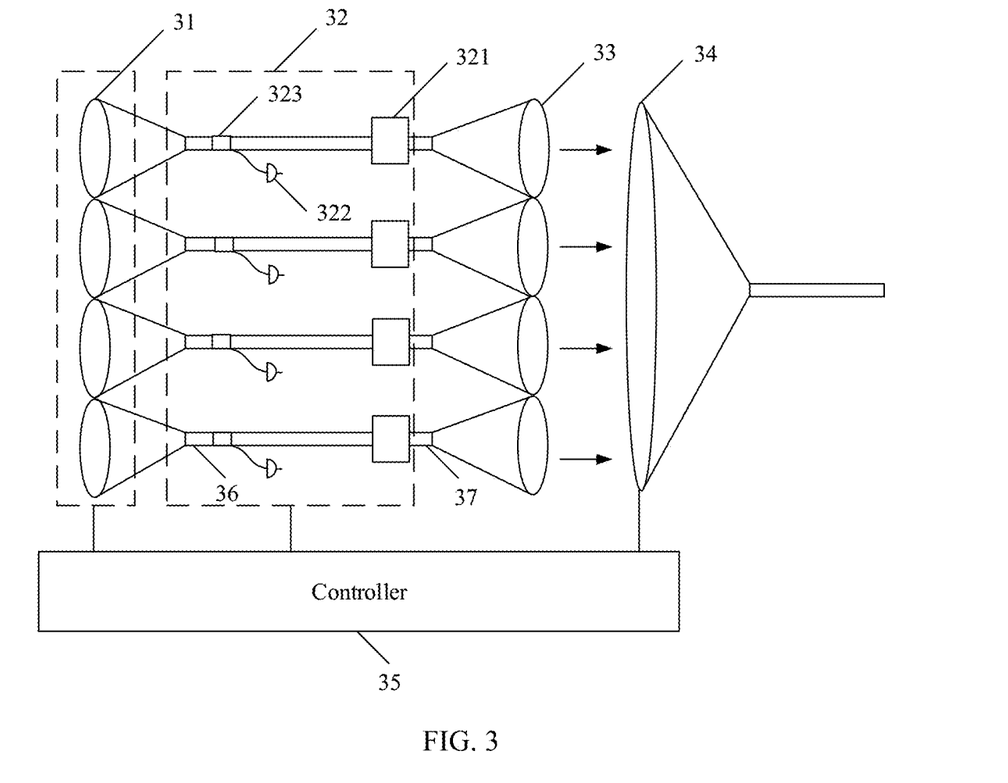
FIG. 3 is a schematic diagram of a space optical coupling apparatus according to an embodiment of this application.

FIG. 3 is a schematic diagram of a space optical coupling apparatus according to an embodiment of this application. As shown in FIG. 3, the space optical coupling apparatus includes M first couplers 31, a phase adjustment apparatus 32, M second couplers 33, a coupling apparatus 34, and a controller 35. The M first couplers 31 are in a one-to-one correspondence with the M second couplers 33, M is a positive integer greater than 1, and in FIG. 3, M=4 is used as an example. The first coupler 31 is configured to receive a beam and couple the beam to the phase adjustment apparatus 32. The phase adjustment apparatus 32 includes M input ports, M phase adjusters 321, M output ports, N detectors 322, and N beam splitters 323, where 1≤N≤M and N is an integer. The M input ports are connected in a one-to-one correspondence with the M phase adjusters 321, and the M phase adjusters 321 are connected in a one-to-one correspondence with the M output ports. The phase adjustment apparatus 32 receives M beams respectively from the M first couplers 31 by using the M input ports. Each beam splitter 323 in the N beam splitters 323 is located between an input port and a phase adjuster 321 corresponding to the input port, and is configured to split a received beam into two beams, and one of the two beams is sent to a corresponding detector 322. Each detector 322 is configured to detect, based on a coupled partial split beam, beam intensity corresponding to the beam, and the beam intensity may assist in reconstructing wavefront information of a beam received by the space optical coupling apparatus. The other beam is sent to the corresponding phase adjuster 321. The N beam splitters 323 are respectively in a one-to-one correspondence with N input ports of the M input ports. The M second couplers 33 receive output light respectively from the M output ports, and couple the output light to the coupling apparatus 34. The coupling apparatus 34 is configured to couple a received beam to a single-mode fiber. The controller 35 is configured to: obtain the beam intensity detected by each detector 322 and the beam intensity on the single-mode fiber, and control, based on the beam intensity detected by each detector 322 and the beam intensity on the single-mode fiber, the M phase adjusters 321 to adjust the phases of received beams respectively.

Optionally, the first coupler 31 may be a lens, an optical fiber coupler, or the like. When the first coupler is a lens, coupling efficiency from space to the single-mode fiber can be significantly improved due to a relatively uniform phase of an optical signal irradiated to a single lens.

Figure 4:
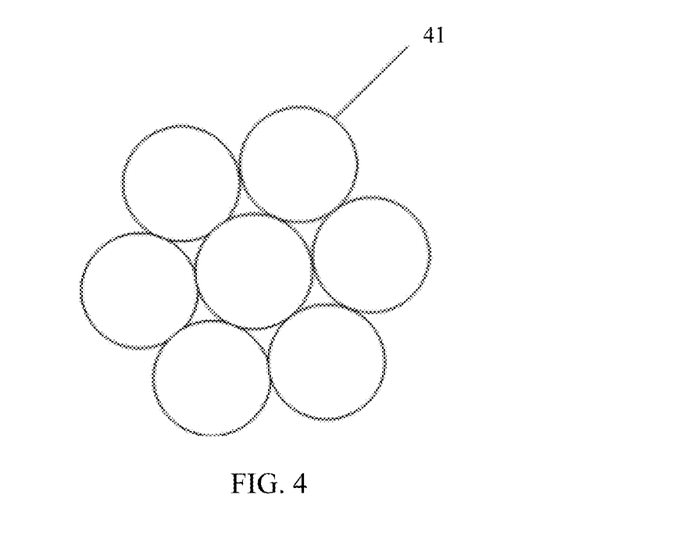
FIG. 4 is a cross-sectional view of a coupler array including M first couplers according to an embodiment of this application.

Optionally, the M first couplers may be referred to as a coupler array. FIG. 4 is a cross-sectional view of a coupler array including M first couplers according to an embodiment of this application. As shown in FIG. 4, couplers 41 in the coupler array are arranged in a hexagonal dense arrangement manner. In this manner, the space coverage of the coupler can be maximized.

Optionally, each input port in the phase adjustment apparatus is connected to a corresponding phase adjuster 321, and each phase adjuster 321 is connected to a corresponding output port via an optical fiber or a waveguide 36.

It should be noted that, in this application, an end face of the optical fiber or the waveguide may be understood as an input port or an output port. One of four optical path structures included in the phase adjustment apparatus 32 in FIG. 3 is used as an example. The phase adjustment apparatus 32 may receive a beam at one end face of one optical fiber or waveguide 36, perform phase adjustment on the beam using the phase adjuster 321, and send the adjusted beam using an end face of another optical fiber or waveguide 37.

Optionally, before the phase adjuster, one beam splitter may be disposed on each optical fiber or waveguide, and each beam splitter is connected to one detector. Alternatively, before the phase adjuster, there is no beam splitter on some optical fibers or waveguides, one beam splitter is disposed on each of other optical fibers or waveguides, and each beam splitter is connected to one detector. It should be understood that, generally, with more detectors, more information can be detected and a better coupling effect can be achieved. Generally, a quantity N of detectors needs to be not fewer than half of a quantity M of input ports. For example, if M=10, N may be between and 10, so as to achieve a coupling effect. However, to reduce costs, fewer than five detectors may also be used.

Optionally, the phase adjuster may use a fiber stretcher (fiber stretcher) structure, or the phase adjuster may be an electro-optic modulator, which is not limited in this application.

Optionally, the second coupler may be an optical fiber coupler or may be a lens, and is configured to reduce a divergence angle of a received beam, so that a beam sent to the coupling apparatus approximates parallel light.

Optionally, the coupling apparatus 34 is any one of the following: a lens, a lens array, an optical fiber coupler, and an optical fiber coupler array.

Optionally, the controller is configured to: calculate, based on the beam intensity detected by each detector and the beam intensity on the single-mode fiber, a Strehl ratio of a spot that reaches the end surface of the single-mode fiber. However, the impact of the atmosphere on a Gaussian beam may be expanded using a Zernike function. Therefore, the controller may feedback a possible Zernike function coefficient by using the Strehl ratio; reconstruct, by using differential evolution, stochastic parallel gradient descent, simulated annealing, or an algorithm that can implement a similar function, wavefront information of a beam received by the space optical coupling apparatus; and control the M phase adjusters based on the wavefront information to respectively adjust phases of light on corresponding optical fibers or waveguides. Then, the controller may continue to obtain the beam intensity detected by each detector and the beam intensity on the single-mode fiber, and calculate, based on the beam intensity detected by each detector and the beam intensity on the single-mode fiber, a Strehl ratio of a spot that reaches the end surface of the single-mode fiber. The controller may feedback a possible Zernike function coefficient by using the Strehl ratio; and reconstruct, by using differential evolution, stochastic parallel gradient descent, simulated annealing, or an algorithm that can implement a similar function, wavefront information of a beam received by the space optical coupling apparatus. Through gradual iterations, the controller may finally reconstruct the wavefront information of the beam received by the space optical coupling apparatus, and control, based on the reconstructed wavefront information, the M phase adjusters to respectively adjust phases of light on corresponding optical fibers or waveguides, so that a phase relationship of the beams emitted from the M output ports is similar to the phase relationship of Gaussian beams. Thus, wavefront phase compensation and light collection efficiency are improved.

The beam intensity on the single-mode fiber may be obtained by using an optical signal processing unit, for example, the optical signal processing unit is configured to process light in the single-mode fiber, so as to obtain the beam intensity of the single-mode fiber, and send the beam intensity to the controller. The optical signal processing unit may be a coherent detector, which is not limited in this application.

Optionally, the controller is further configured to adjust the coupling apparatus, so that a spot of an output beam of the coupling apparatus is at a center position of the end face of the single-mode fiber. When a center position of the spot of the beam is aligned with a center position of the single-mode fiber, this adjustment may achieve an optimal effect, that is, the coupling efficiency of the single-mode fiber is highest.

Optionally, the M second couplers are located in one plane, and the space optical coupling apparatus may further include a second drive apparatus connected to the coupling apparatus; and the second drive apparatus is configured to drive the coupling apparatus to move in a plane parallel to the plane in which the M second couplers are located. In this way, the coupling apparatus can track the spot center position of a beam in real time, thereby improving coupling efficiency of the single-mode fiber. It should be understood that a port that is of the single-mode fiber and that is configured to receive space light needs to be located in a focal plane of the coupling apparatus.

Optionally, the second drive apparatus may be a two-dimensional translation table or a device that has a function similar to the two-dimensional translation table. This is not limited in this embodiment of this application.

It should be noted that in this application, some or all devices included in the foregoing space optical coupling apparatus may be integrated. For example, the M first couplers, the optical fiber or the waveguide, the N beam splitters, the phase adjustment apparatus, the M second couplers, and the coupling apparatus may be integrated into one module. Alternatively, the M first couplers, the optical fiber or the waveguide, the N beam splitters, the phase adjustment apparatus, the M second couplers, the coupling apparatus, and the controller may be integrated into one module. Based on this, on one hand, the coupling efficiency of the space optical coupling apparatus can be improved, so that the space optical coupling apparatus can adapt to turbulence of different intensity, and stability of the space optical coupling apparatus for resisting earthquakes and high and low temperatures can be improved. On the other hand, the space optical coupling apparatus has a small size, low power consumption, and an easy integration effect. Finally, because devices in the space optical coupling apparatus can implement module integration, a feedback loop of the apparatus can be reduced, and a feedback speed of the space optical coupling apparatus can be improved.

In conclusion, this embodiment of this application provides the space optical coupling apparatus, and the apparatus has the following effects: The controller may control, based on the beam intensity detected by each detector and the beam intensity on the single-mode fiber, the M phase adjusters to respectively adjust the phases of the light beams on corresponding optical fibers or waveguides. Therefore, a phase relationship of beams emitted from the M output ports is made similar to the phase relationship of Gaussian beams. Wavefront phase compensation and light collection efficiency are improved. Further, the impact of beam wander, an angle of arrival fluctuation, a laser intensity fluctuation, a phase fluctuation, beam expansion, and the like on optical fiber coupling can be counteracted or cancelled.

Further, when the first coupler is a lens, coupling efficiency from space to the single-mode fiber can be significantly improved due to a relatively uniform phase of an optical signal irradiated to a single lens. In addition, when the space optical coupling apparatus includes the second drive apparatus connected to the coupling apparatus, the second drive apparatus is configured to drive the coupling apparatus to move in a plane parallel to the plane in which the M second couplers are located. In this way, the coupling apparatus can track the spot center position of a beam in real time, thereby improving coupling efficiency of the single-mode fiber. In addition, some or all devices in the space optical coupling apparatus can be modularly integrated, so that the performance and stability of the space optical coupling apparatus can be improved, and a small size, low power consumption, and an easy integration effect of the space optical coupling apparatus can be achieved.

Figure 5:
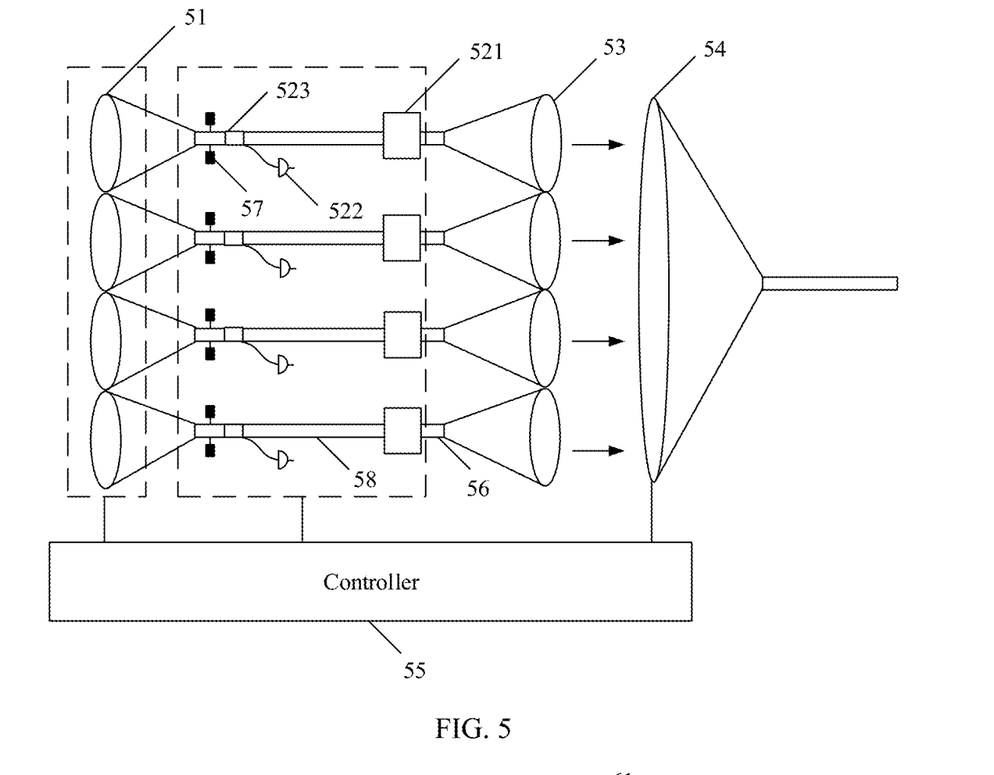
FIG. 5 is a schematic diagram of a space optical coupling apparatus according to another embodiment of this application.

FIG. 5 is a schematic diagram of a space optical coupling apparatus according to another embodiment of this application. As shown in FIG. 5, the space optical coupling apparatus includes M first couplers 51, a phase adjustment apparatus, M second couplers 53, a coupling apparatus 54, a controller 55, and M first drive apparatuses 57, where the M first couplers 51 are in a one-to-one correspondence with the M second couplers 53, and M is a positive integer greater than 1. The first coupler 51 is configured to receive a beam and couple the beam to the phase adjustment apparatus. The phase adjustment apparatus includes M input ports, M phase adjusters 521, M output ports, N detectors 522, and N beam splitters 523, where $1 \leq N \leq M$ and N is an integer. The M input ports are connected in a one-to-one correspondence with the M phase adjusters 521, and the M phase adjusters 521 are connected in a one-to-one correspondence with the M output ports. The phase adjustment apparatus receives M beams respectively from the M first couplers 51 by using the M input ports. Each beam splitter 523 in the N beam splitters 523 is located between an input port and a phase adjuster 521 corresponding to the input port, and is configured to split a received beam into two beams, and one beam is sent to a corresponding detector 522. Each detector 522 is configured to detect, based on a coupled partial split beam, the beam intensity corresponding to the beam, and the beam intensity may assist in reconstructing wavefront information of a beam received by the space optical coupling apparatus. The other beam is sent to the corresponding phase adjuster 521. The N beam splitters 523 are respectively in a one-to-one correspondence with N input ports of the M input ports. The M second couplers 53 receive output light respectively from the M output ports, and couple the output light to the coupling apparatus 54. The coupling apparatus 54 is configured to couple a received beam to a single-mode fiber. The controller 55 is configured to: obtain the beam intensity detected by each detector 522 and the beam intensity on the single-mode fiber, and control, based on the beam intensity detected by each detector 522 and the beam intensity on the single-mode fiber, the M phase adjusters 521 to respectively adjust phases of received beams respectively.

Optionally, the first coupler may be a lens, an optical fiber coupler, or the like. When the first coupler is a lens, the coupling efficiency of coupling the light beam from the space to the single-mode fiber can be significantly improved due to a relatively uniform phase of an optical signal irradiated to a single lens.

Optionally, the M first couplers may be referred to as a coupler array. As shown in FIG. 4, a coupler arrangement manner in the coupler array is a hexagonal dense arrangement manner. This arrangement manner can maximize space coverage of the coupler.

Optionally, each input port in the phase adjustment apparatus is connected to a corresponding phase adjuster 521, and each phase adjuster 521 is connected to a corresponding output port by using an optical fiber or a waveguide.

It should be noted that, in this application, an end face of the optical fiber or the waveguide may be understood as an input port or an output port. A first one of four optical path structures included in the phase adjustment apparatus in FIG. 5 is used as an example. The phase adjustment apparatus may receive a beam by using one end face of one optical fiber or waveguide 58, perform phase adjustment on the beam by using the phase adjuster 521, and send an adjusted beam by using an end face of another optical fiber or waveguide 56.

Optionally, before the phase adjuster, one beam splitter may be disposed on each optical fiber or waveguide, and each beam splitter is connected to one detector. Alternatively, before the phase adjuster, there is no beam splitter and detector on some optical fibers or waveguides, one beam splitter is disposed on each of other optical fibers or waveguides, and each beam splitter is connected to one detector. It should be understood that, generally, more detectors can detect more information, and a better coupling effect can be achieved. Generally, a quantity N of detectors needs to be not fewer than half of a quantity M of input ports. For example, if M=10, N may be from 5 to 10, so as to ensure a coupling effect. However, to further reduce costs, fewer than five detectors may also be used.

Optionally, the phase adjuster may use a fiber stretcher (fiber stretcher) structure, or the phase adjuster may be an electro-optic modulator, which is not limited in this application.

Optionally, the second coupler may be an optical fiber coupler or may be a lens, and is configured to reduce a divergence angle of a received beam, so that a beam sent to the coupling apparatus approximates parallel light.

Optionally, the coupling apparatus is any one of the following: a lens, a lens array, an optical fiber coupler, and an optical fiber coupler array.

The M first drive apparatuses are in a one-to-one correspondence with the M input ports. Each first drive apparatus is disposed at a front end of a corresponding optical fiber or waveguide (just near an input port position of the optical fiber or the waveguide). As shown in FIG. 5, the first drive apparatus is configured to adjust a position of a corresponding input port, so that a spot center of a received beam is aligned with a center position of a receiving end face of a corresponding optical fiber or waveguide, thereby improving the optical coupling efficiency of the space optical coupling apparatus.

Figure 6:
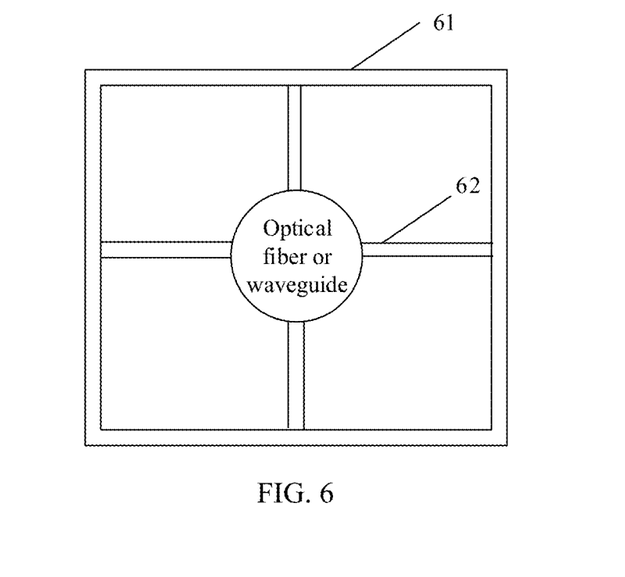
FIG. 6 is a schematic diagram of a first drive apparatus disposed on a front end face of an optical fiber or a waveguide according to an embodiment of this application.

Specifically, a front end face of each optical fiber or waveguide is connected to one first drive apparatus. The controller may adjust a position of the optical fiber or the waveguide by using the first drive apparatus, so as to adjust a position of a spot of a received beam on a corresponding optical fiber or waveguide. FIG. 6 is a schematic diagram of a first drive apparatus disposed on a front end face of an optical fiber or a waveguide according to an embodiment of this application. As shown in FIG. 6, the first drive apparatus may include four lead zirconate titanate piezoelectric ceramic transducers (PZT) and a support wall 61 disposed outside the four PZTs. The optical fiber or the waveguide may be connected to the support wall 61 by using the four PZTs 62. The controller can control a position of an end face of the optical fiber by driving extension and contraction of the PZT.

It should be noted that the first drive apparatus disposed on the front-end face of the optical fiber or the waveguide may alternatively include another quantity of PZTs, for example, two or three PZTs, provided that the optical fiber or the waveguide can be connected to the support wall by using the PZTs. A quantity of PZTs is not limited in this application.

In addition, in a case of weak turbulence or a relatively large quantity of first couplers, the first drive apparatus may use a plurality of optical fibers or a plurality of waveguides as one beam to control these optical fibers or waveguides to move together. In this case, one first drive apparatus may adjust a plurality of optical fibers or waveguides, and a quantity of first drive apparatuses may be fewer than M.

Further, each of the N detectors is further configured to collect the beam intensity on an optical fiber or a waveguide corresponding to the detector; and the controller controls the first drive apparatus based on the beam intensity so as to adjust the position of a spot of a received beam on the corresponding optical fiber or waveguide. For example, when the beam intensity collected by a detector indicates that the beam intensity on a corresponding optical fiber or waveguide is relatively weak, the controller adjusts the position of a spot of a received beam on the corresponding optical fiber or waveguide based on the beam intensity, so that the center position of the spot of the received beam is closer to a center position of the corresponding optical fiber or waveguide.

Further, the controller is configured to: based on the beam intensity detected by each detector, the beam intensity on the single-mode fiber, and the displacement amount of each first drive apparatus (where the displacement amount directly reflects a tilt angle and a direction of a local wavefront), reconstruct, by using 2D surface fitting or in a similar manner, wavefront information of a beam received by the space optical coupling apparatus, and control, based on the wavefront information, the M phase adjusters to respectively adjust beam phases on corresponding fibers or waveguides.

Alternatively, the controller is configured to: calculate, based on the beam intensity detected by each detector and the beam intensity on the single-mode fiber, a Strehl ratio of a spot that reaches the end surface of the single-mode fiber. However, the impact of the atmosphere on a Gaussian beam may be expanded by using a Zernike function. Therefore, the controller may feedback a possible Zernike function coefficient by using the Strehl ratio; reconstruct, by considering the displacement amount and using differential evolution, stochastic parallel gradient descent, simulated annealing, or an algorithm that can implement a similar function, wavefront information of a beam received by the space optical coupling apparatus; and control the M phase adjusters based on the wavefront information to respectively adjust beam phases on corresponding optical fibers or waveguides. Then, the controller may continue to obtain the beam intensity detected by each detector and the beam intensity on the single-mode fiber, and calculate, based on the beam intensity detected by each detector and the beam intensity on the single-mode fiber, a Strehl ratio of a spot that reaches the end surface of the single-mode fiber. The controller may feedback a possible Zernike function coefficient by using the Strehl ratio; and reconstruct, by considering the displacement amount and using differential evolution, stochastic parallel gradient descent, simulated annealing, or an algorithm that can implement a similar function, wavefront information of a beam received by the space optical coupling apparatus. Through gradual iterations, the controller may finally reconstruct the wavefront information of the beam received by the space optical coupling apparatus, and control, based on the reconstructed wavefront information, the M phase adjusters to respectively adjust phases of light on corresponding optical fibers or waveguides, so that a phase relationship of the beams emitted from the M output ports is similar to the phase relationship of Gaussian beams. Wavefront phase compensation and light collection efficiency are improved. The beam intensity on the single-mode fiber may be obtained by using an optical signal processing unit, for example, the optical signal processing unit is configured to process light in the single-mode fiber, so as to obtain the beam intensity of the single-mode fiber, and send the beam intensity to the controller. The optical signal processing unit may be a coherent detector, which is not limited in this application.

In addition, in a tracking process, a wavefront (whose function is the same as that of a wavefront sensor) of an incident beam may be calculated by using a displacement amount of an input port. In this case, the information may be used to adjust a phase adjuster on the optical fiber/the waveguide based on a feedback signal, so as to implement more accurate and faster adjustment of relative phases of signals in different optical fibers/waveguides.

Optionally, the controller adjusts the coupling apparatus, so that a spot obtained after a beam is coupled to the space through the M second couplers is at a center position of the end face of the single-mode fiber after the spot passes through the coupling apparatus. When a center position of the spot of the beam is aligned with a center position of the single-mode fiber, this adjustment may achieve an optimal effect, that is, the coupling efficiency of the single-mode fiber is highest.

Optionally, the M second couplers are located in one plane, and the space optical coupling apparatus may further include a second drive apparatus connected to the coupling apparatus; and the second drive apparatus is configured to drive the coupling apparatus to move in a plane parallel to the plane in which the second coupler arrays are located. In this way, the coupling apparatus can track the spot center position of a beam in real time, thereby improving the coupling efficiency of the single-mode fiber. It should be understood that a port of the single-mode fiber configured to receive space light needs to be located in a focal plane of the coupling apparatus.

It should be noted that in this application, some or all devices included in the foregoing space optical coupling apparatus may be integrated. For example, the M first couplers, the optical fiber or the waveguide, the N beam splitters, the phase adjustment apparatus, the M second couplers, and the coupling apparatus may be integrated into one module. Alternatively, the M first couplers, the optical fiber or the waveguide, the N beam splitters, the phase adjustment apparatus, the M second couplers, the coupling apparatus, and the controller may be integrated into one module. Based on this, on one hand, coupling efficiency of the space optical coupling apparatus can be improved, so that the space optical coupling apparatus can adapt to turbulence of different intensity, and stability of the space optical coupling apparatus for resisting earthquakes and high and low temperatures can be improved. On the other hand, the space optical coupling apparatus has a small size, low power consumption, and an easy integration effect. Finally, because devices in the space optical coupling apparatus can implement module integration, a feedback loop of the apparatus can be reduced, and a feedback speed of the space optical coupling apparatus can be improved.

In conclusion, this embodiment of this application provides the space optical coupling apparatus, and the apparatus has the following features: The controller is configured to control, based on the beam intensity detected by each detector, the beam intensity on the single-mode fiber, and the displacement amount of each first drive apparatus, the M phase adjusters to separately adjust the beam phases on corresponding optical fibers or waveguides. Therefore, a phase relationship of the beams emitted from the M output ports is made similar to the phase relationship of Gaussian beams. Wavefront phase compensation and light collection efficiency are improved. Further, the impact of beam wander, an angle of arrival fluctuation, a laser intensity fluctuation, a phase fluctuation, beam expansion, and the like on optical fiber coupling can be counteracted.

Further, when an array of the first couplers is a lens array, the coupling efficiency from the space to the single-mode fiber can be significantly improved due to a relatively uniform phase of an optical signal irradiated to a single lens. In addition, when the space optical coupling apparatus includes the second drive apparatus connected to the coupling apparatus, the second drive apparatus is configured to drive the coupling apparatus to move in a plane parallel to the plane in which the M second couplers are located. In this way, the coupling apparatus can track the spot center position of a beam in real time, thereby improving the coupling efficiency of the single-mode fiber. In addition, some or all devices in the space optical coupling apparatus can be modularly integrated, so that the performance and stability of the space optical coupling apparatus can be improved, and a small size, low power consumption, and an easy integration effect of the space optical coupling apparatus can be achieved.

Figure 7:
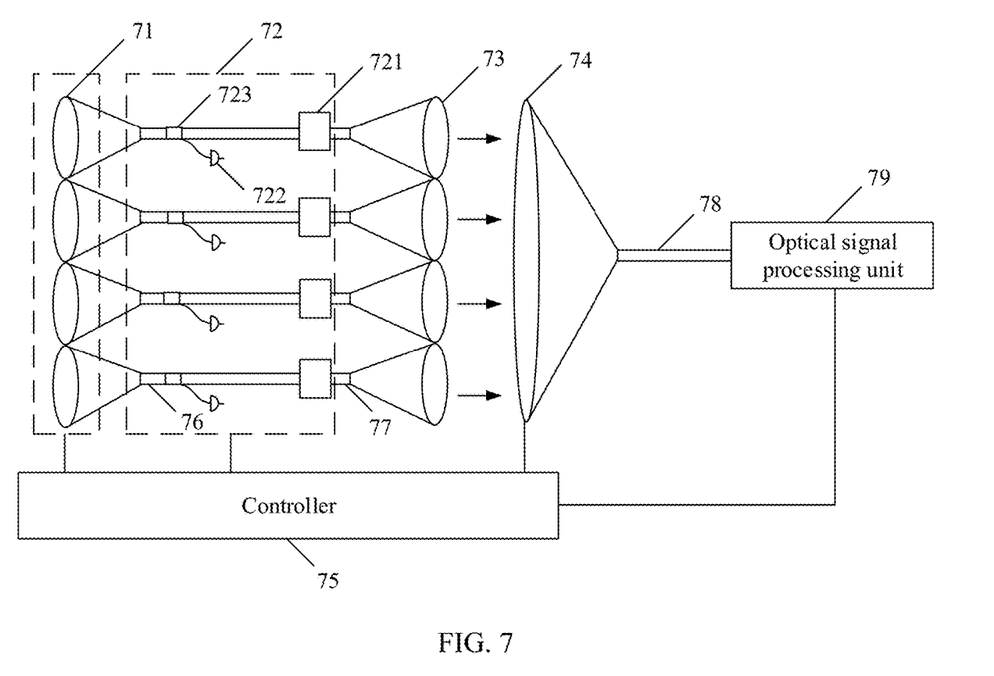
FIG. 7 is a schematic diagram of a space optical coupling apparatus according to still another embodiment of this application.

Based on the embodiment corresponding to FIG. 3, the space optical coupling apparatus provided in this application may further include an optical signal processing unit. FIG.

7 is a schematic diagram of a space optical coupling apparatus according to still another embodiment of this application. As shown in FIG. 7, the apparatus further includes: an optical signal processing device 79 whose two ends are respectively connected to a single-mode fiber 78 and a controller 75. The optical signal processing device 79 is configured to process light in the single-mode fiber 78, obtain a beam intensity of the single-mode fiber 78, and send the beam intensity of the single-mode fiber 78 to the controller 75.

Optionally, the optical signal processing device 79 is an optical amplifier or a coherent detector.

As described above, in this application, some or all devices included in the foregoing space optical coupling apparatus may be integrated. Therefore, the optical signal processing unit may alternatively be integrated into one module with some or all devices included in the space optical coupling apparatus. First, the coupling efficiency of the space optical coupling apparatus can be improved, so that the space optical coupling apparatus can adapt to a turbulence of different intensity, and stability of the space optical coupling apparatus for resisting earthquakes and high and low temperatures can be improved. Second, the space optical coupling apparatus has a small size, low power consumption, and an easy integration effect. Finally, because the devices in the space optical coupling apparatus can be integrated through module integration, a feedback loop of the apparatus can be reduced, and a feedback speed of the space optical coupling apparatus can be improved.

Figure 8:
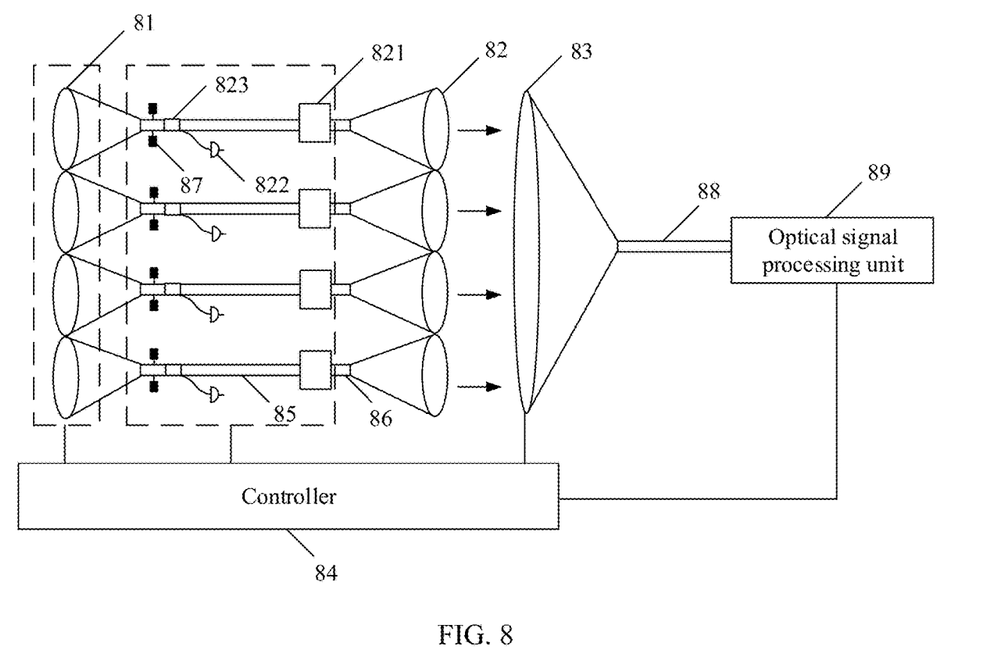
FIG. 8 is a schematic diagram of a space optical coupling apparatus according to yet another embodiment of this application.

Based on the embodiment corresponding to FIG. 5, the space optical coupling apparatus provided in this application may further include an optical signal processing unit. FIG. 8 is a schematic diagram of a space optical coupling apparatus according to yet another embodiment of this application. As shown in FIG. 8, the apparatus further includes: an optical signal processing unit 89 whose two ends are respectively connected to a single-mode fiber 88 and a controller 84. The optical signal processing unit 89 is configured to process light in the single-mode fiber 88, obtain a beam intensity of the single-mode fiber 88, and send the beam intensity of the single-mode fiber 88 to the controller 84.

Optionally, the optical signal processing unit 89 is an optical amplifier or a coherent detector.

As described above, in this application, some or all devices included in the foregoing space optical coupling apparatus may be integrated. Therefore, the optical signal processing unit may alternatively be integrated into one module with some or all devices included in the space optical coupling apparatus. First, the coupling efficiency of the space optical coupling apparatus can be improved, so that the space optical coupling apparatus can adapt to disturbance of different intensity, and the stability of the space optical coupling apparatus for resisting earthquakes and high and low temperatures can be improved. Second, the space optical coupling apparatus has a small size, low power consumption, and an easy integration effect. Finally, because the devices in the space optical coupling apparatus can be integrated through module integration, a feedback loop of the apparatus can be reduced, and a feedback speed of the space optical coupling apparatus can be improved.

Figure 9:
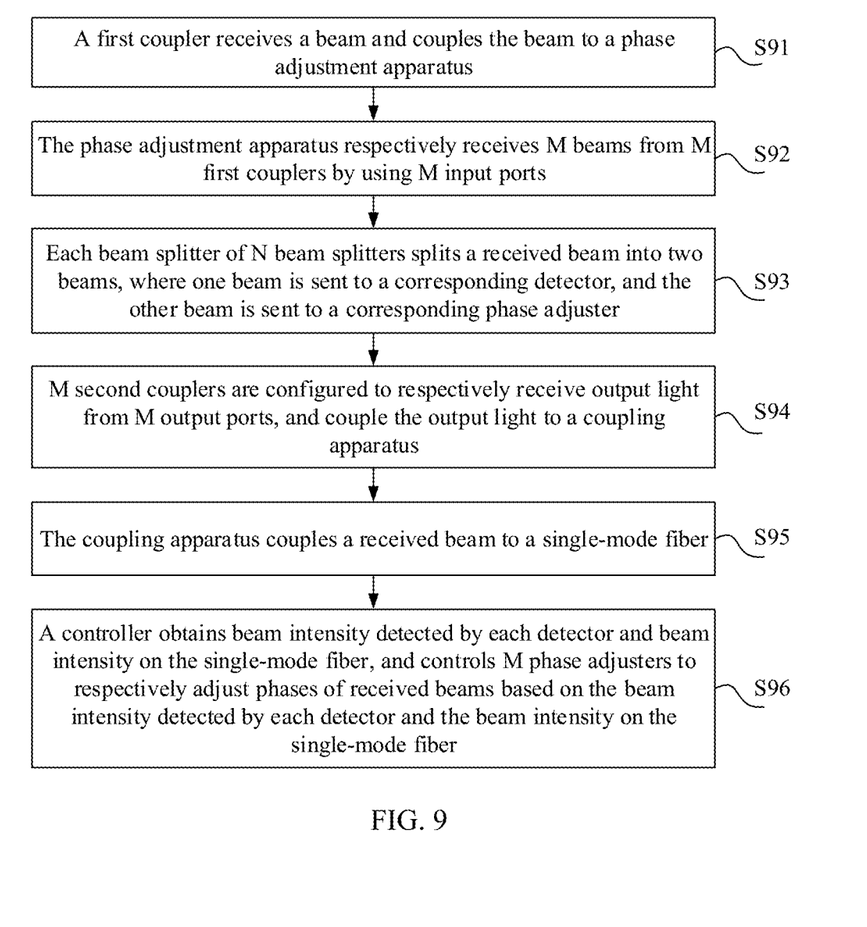
FIG. 9 is a flowchart of a space optical coupling method according to an embodiment of this application.

FIG. 9 is a flowchart of a space optical coupling method according to an embodiment of this application. An implementing entity of the method is a space optical coupling apparatus. The apparatus includes M first couplers, a phase adjustment apparatus, M second couplers, a coupling apparatus, and a controller. The M first couplers are in a one-to-one correspondence with the M second couplers, and M is a positive integer greater than 1. The phase adjustment apparatus includes M input ports, M phase adjusters, M output ports, N beam splitters, and N detectors, where $1 \leq N \leq M$, and N is an integer; the M input ports are connected in a one-to-one correspondence with the M phase adjusters, and the M phase adjusters are connected in a one-to-one correspondence with the M output ports; the N beam splitters are respectively in a one-to-one correspondence with N input ports of the M input ports; and each beam splitter of the N beam splitters is located between an input port and a phase adjuster corresponding to the input port. Correspondingly, the method includes the following steps.

Step S91: The first coupler receives a beam and couples the beam to the phase adjustment apparatus.

Step S92: The phase adjustment apparatus respectively receives M beams from the M first couplers by using the M input ports.

Step S93: Each beam splitter of the N beam splitters splits a received beam into two beams, where one beam is sent to a corresponding detector, and the other beam is sent to a corresponding phase adjuster.

Step S94: The M second couplers are configured to respectively receive output light from the M output ports, and couple the output light to the coupling apparatus.

Step S95: The coupling apparatus couples a received beam to a single-mode fiber.

Step S96: The controller obtains the beam intensity detected by each detector and the beam intensity on the single-mode fiber, and controls the M phase adjusters to respectively adjust the phases of the received beams based on the beam intensity detected by each detector and the beam intensity on the single-mode fiber.

It should be noted that the method is executed by the foregoing space optical coupling apparatus. For repeated content and effects of the method, refer to the apparatus embodiment. Details are not described herein again.

The controller in the foregoing embodiment of this application may be a processor, a field-programmable gate array (FPGA), or the like.

The embodiments of this application are described with reference to the accompanying drawings. However, this application is not limited to the foregoing specific implementations. The foregoing specific implementations are merely examples, but are not restrictive. Persons of ordinary skill in the art may further make many forms without departing from the purpose and the scope of the claims of this application, and all the forms fall within the protection scope of this application.

What is claimed is:

1. A space optical coupling apparatus, comprising: M first couplers, a phase adjustment apparatus, M second couplers, a coupling apparatus, and a controller, wherein the M first couplers are in a one-to-one correspondence with the M second couplers, and M is a positive integer greater than 1;

each of the first M couplers is configured to receive a beam and couple the beam to the phase adjustment apparatus;

the phase adjustment apparatus comprises M input ports, M phase adjusters, M output ports, N beam splitters, and N detectors, wherein $1 \leq N \leq M$, and N is an integer; and the M input ports are connected in a one-to-one correspondence with the M phase adjusters, and the M phase adjusters are connected in a one-to-one correspondence with the M output ports;

the phase adjustment apparatus receives M beams respectively from the M first couplers through the M input ports; each beam splitter of the N beam splitters is located between an input port and a phase adjuster corresponding to the input port, and is configured to split a received beam into two beams, one of the two beams is sent to a corresponding detector, and one of the two beams is sent to a corresponding phase adjuster; and the N beam splitters correspond to N input ports of the M input ports;

the M second couplers are configured to: receive output light respectively from the M output ports, and couple the output light from the M output ports to the coupling apparatus;

the coupling apparatus is configured to couple the output light from the M output ports to a single-mode fiber; and the controller is configured to: obtain a beam intensity detected by each detector and a beam intensity on the single-mode fiber, and control, based on the beam intensity detected by each detector and the beam intensity on the single-mode fiber, the M phase adjusters to respectively adjust phases of the beams received by the M first couplers;

the controller is further configured to adjust the coupling apparatus to adjust a spot of the output light to be at a center position of an end face of the single-mode fiber.

2. The apparatus according to claim 1, wherein
the controller is configured to: reconstruct, based on the beam intensity detected by each detector and the beam intensity on the single-mode fiber, wavefront information of the beam received by the space optical coupling apparatus, and control, based on the wavefront information, the M phase adjusters to respectively adjust the phases of the M beams received by the M first couplers.

3. The apparatus according to claim 1, wherein each input port in the phase adjustment apparatus is connected to a corresponding phase adjuster, and each phase adjuster is connected to a corresponding output port by using an optical fiber or a waveguide.

4. The apparatus according to claim 3, wherein the apparatus further comprises: M first drive apparatuses, and the M first drive apparatuses are in a one-to-one correspondence with the M input ports; and
each first drive apparatus is configured to adjust a position of a corresponding input port.

5. The apparatus according to claim 4, wherein the controller is further configured to control, based on the beam intensity detected by each detector, the first drive apparatus, to adjust a position of a corresponding input port.

6. The apparatus according to claim 5, wherein the controller is configured to control, based on the beam intensity detected by each detector, the beam intensity on the single-mode fiber, and a displacement amount of each input port, the M phase adjusters to adjust the phases of the M beams received by the M first couplers.

7. The apparatus according to claim 6, wherein the controller is configured to: reconstruct, based on the beam intensity detected by each detector, the beam intensity on the single-mode fiber, and the displacement amount of each input port, wavefront information of the beam received by the space optical coupling apparatus, and control, based on the wavefront information, the M phase adjusters to respectively adjust the phases of the M beams received by the M first couplers.

8. The apparatus according to claim 1, wherein the M first couplers are arranged in a hexagonal dense arrangement.

9. The apparatus according to claim 1, wherein the M second couplers are located in one plane, and the apparatus further comprises a second drive apparatus connected to the coupling apparatus; and
the second drive apparatus is configured to drive the coupling apparatus to move in a plane parallel to the plane in which the M second couplers are located.

10. The apparatus according to claim 1, wherein the apparatus further comprises: an optical signal processing unit whose input port and output port are respectively connected to the single-mode fiber and the controller; and
the optical signal processing unit is configured to: process a beam in the single-mode fiber, obtain the beam intensity on the single-mode fiber, and send the beam intensity on the single-mode fiber to the controller.

11. The apparatus according to claim 10, wherein the optical signal processing unit is a coherent detector.

* * * * *